US010769702B2

(12) United States Patent
Egozi et al.

(10) Patent No.: US 10,769,702 B2
(45) **Date of Patent: *Sep. 8, 2020**

(54) RECOMMENDATIONS BASED UPON EXPLICIT USER SIMILARITY

(71) Applicant: TRANSFORM SR BRANDS LLC, Hoffman Estates (IL)

(72) Inventors: Ofer Egozi, Kfar Vitkin (IL); Amit Moran, Rehovot (IL); Oren Shamir, Kfar Saba (IL)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 123 days.

This patent is subject to a terminal disclaimer.

(21) Appl. No.: 15/980,396

(22) Filed: May 15, 2018

(65) Prior Publication Data

US 2018/0357703 A1 Dec. 13, 2018

Related U.S. Application Data

(63) Continuation of application No. 14/206,913, filed on Mar. 12, 2014, now Pat. No. 9,972,042.

(60) Provisional application No. 61/802,338, filed on Mar. 15, 2013.

(51) Int. Cl.

*G06Q 10/10* (2012.01)
*G06Q 30/06* (2012.01)
*G06Q 30/02* (2012.01)
*G06Q 50/00* (2012.01)

(52) U.S. Cl.

CPC ......... *G06Q 30/0631* (2013.01); *G06Q 10/10* (2013.01); *G06Q 30/02* (2013.01); *G06Q 50/01* (2013.01)

(58) Field of Classification Search

CPC ......... G06Q 10/10; G06Q 30/06; G06Q 50/00
USPC ........................................... 705/26.7; 706/52
See application file for complete search history.

(56) References Cited

U.S. PATENT DOCUMENTS 6,947,922 B1 9/2005 Glance
7,734,680 B1 6/2010 Kurapati
8,060,463 B1 * 11/2011 Spiegel .................. G06Q 30/02 707/609
8,073,794 B2 12/2011 Amer-Yahia
8,250,012 B1 8/2012 Whitman
8,423,542 B2 * 4/2013 Moon .................... G06Q 30/02 707/732
8,463,295 B1 6/2013 Caralis
8,554,723 B2 10/2013 Spiegel
(Continued)

FOREIGN PATENT DOCUMENTS

EP 2249261 A1 11/2010

OTHER PUBLICATIONS

Canadian Intellectual Patent Office, Examiner Requisition in Application No. 2,846,025. dated Jun. 15, 2017 (4 pages).
(Continued)

*Primary Examiner* — Oluseye Iwarere
(74) *Attorney, Agent, or Firm* — McAndrews, Held & Malloy, Ltd.

(57) ABSTRACT

A system and method for providing recommendations to individuals on a social network, in which the recommendations include information indicating the similarity of the individuals to one another, to aid the individuals in judging the degree to which the opinions of the others are applicable to the themselves.

20 Claims, 7 Drawing Sheets

(56) References Cited

U.S. PATENT DOCUMENTS 8,661,050 B2 2/2014 Varshavsky
8,903,834 B2 12/2014 Ciancutti
9,251,536 B2 2/2016 Caralis
2005/0251411 A1* 11/2005 Ishii ..................... G06Q 10/06 709/206
2006/0173872 A1* 8/2006 Koike .................. G06Q 30/02
2008/0065741 A1 3/2008 Stratton
2009/0150120 A1* 6/2009 Choi ..................... G06Q 30/02 702/179
2009/0164400 A1 6/2009 Amer-Yahia
2009/0197681 A1 8/2009 Krishnamoorthy
2010/0030859 A1* 2/2010 Huang ............... G06F 16/9577 709/206
2010/0312724 A1* 12/2010 Pinckney .............. G06Q 30/02 706/11
2010/0332324 A1 12/2010 Khosravy et al.
2011/0125783 A1 5/2011 Whale
2011/0145719 A1 6/2011 Chen
2011/0177480 A1* 7/2011 Menon .................... G09B 7/00 434/238
2011/0177482 A1* 7/2011 Katz ....................... G09B 7/00 434/322
2011/0177483 A1* 7/2011 Needham ................ G09B 7/00 434/322
2011/0238608 A1 9/2011 Sathish
2011/0302158 A1 12/2011 Sanders
2012/0036137 A1 2/2012 Naidu
2012/0047150 A1 2/2012 Spiegel
2012/0078725 A1 3/2012 Maitra et al.
2012/0096013 A1 4/2012 Ciancutti
2012/0164620 A1* 6/2012 Needham ................ G09B 7/00 434/350
2012/0239495 A1 9/2012 Hu
2012/0278317 A1* 11/2012 Spiegel .................. G06Q 30/02 707/731
2012/0323659 A1 12/2012 Konduru
2013/0024471 A1 1/2013 Mitrovic
2013/0124449 A1* 5/2013 Pinckney ............... G06N 5/048 706/52
2013/0204825 A1 8/2013 Su
2013/0232200 A1 9/2013 Knapp
2013/0268317 A1 10/2013 Mattila
2013/0346233 A1 12/2013 Caralis
2014/0108427 A1 4/2014 Spiegel
2014/0222622 A1 8/2014 Du
2014/0257795 A1 9/2014 Birnbaum
2014/0355874 A1* 12/2014 Sakamaki ........... G06K 9/6215 382/165
2015/0379648 A1* 12/2015 Spiegel .................. G06Q 30/02 705/319
2018/0357322 A1* 12/2018 Sharma ............... G06F 16/9035

OTHER PUBLICATIONS

Canadian Intellectual Patent Office, Examiner Requisition in Application No. 2,846,025. dated Jul. 28, 2016 (4 pages).

Canadian Intellectual Patent Office, Examiner Requisition in Application No. 2,846,025. dated Aug. 3, 2015 (5 pages).

European Patent Office, Office Action in European Patent Application No. 14159810.2, dated Mar. 2, 2016 (5 pages).

European Patent Office, European Search Report for Patent Application No. 14159810.2, dated Apr. 30, 2014 (6 pages).

Amtsblatt EPA, Official Journal EPO, Journal official OEB Nov. 2007, pp. 592-593, XP007905525 (2 pages).

* cited by examiner

RECOMMENDATIONS BASED UPON EXPLICIT USER SIMILARITY

CROSS-REFERENCE TO RELATED APPLICATIONS

The present application is a continuation of U.S. patent application Ser. No. 14/206,913, filed Mar. 12, 2014, which makes reference to, claims benefit of, and claims priority to U.S. Provisional Patent Application No. 61/802,338, filed Mar. 15, 2013, both of which are hereby incorporated herein by reference, in their entirety.

FIELD OF THE INVENTION

Certain embodiments of the invention relate to systems and methods that provide recommendations. More specifically, certain embodiments of the present invention relate to systems and methods for providing recommendations to individuals on a social network, in which the recommendations include information indicating the similarity of the individuals to one another, to aid the individuals in judging the degree to which the opinions of the others are applicable to themselves.

BACKGROUND OF THE INVENTION

Automated recommendations today are frequently based on an analysis of implicit patterns of user behavior and are reflected to users in an obscure manner, such as, for example, recommendations in a form such as "people who viewed this also viewed," that are currently presented to viewers on many e-commerce sites today. This type of information is of limited use to a viewer, in that it reduces the likelihood that the viewer will truly relate to the recommendation, since they do not know who the other "viewers" are, and do not know why what the others viewed is relevant to their own specific case. In another example, the present viewer may be presented with average ratings that other viewers gave to a certain product. In this situation, the present viewer does not know if the rating of the other viewers is really relevant for them, as the interest or needs of the other viewers may be quite different from the interests or needs of the present viewer.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method that provides as part of a recommendation to a consumer, a calculated measure of similarity between consumers upon which the recommendation is based, and the consumer viewing the recommendation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
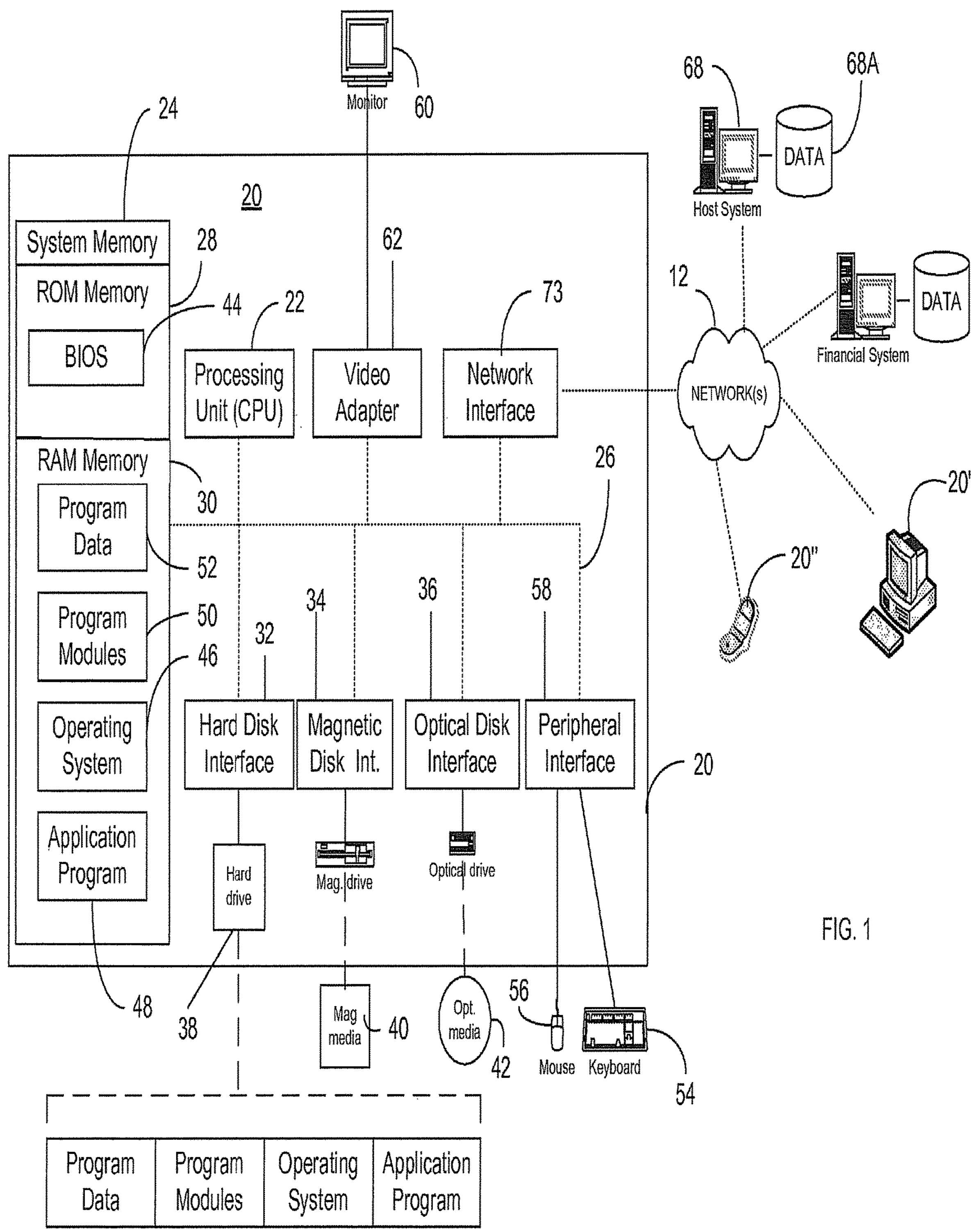
FIG. 1 is a block diagram of an exemplary computer network in which the inventive concepts discussed herein may be practiced, in accordance with a representative embodiment of the present invention.

Certain embodiments of the invention relate to systems and methods that provide recommendations. More specifically, certain embodiments of the present invention relate to systems and methods for providing recommendations to individuals on a social network, in which the recommendations include information indicating the similarity of the individuals to one another, to aid the individuals in judging the degree to which the opinions of the others are applicable to themselves. The present invention improves the degree to which a user can make use of recommendation of others by enabling them to rely on a calculation of similarity between users and to use such a calculation to present one or more indications of similarity between the users on which the recommendation is based, and the user who is viewing the recommendation.

The following description of example systems and methods is not intended to limit the scope of the description to the precise form or forms detailed herein. Instead the following description is intended to be illustrative so that others may follow its teachings.

In accordance with a representative embodiment of the present invention, a system provides for the use of commodity hardware, off the shelf software, OS independent applications, form factor independent devices (PC, tablets, smart phones etc), media independent (voice, text, video) and cloud based infrastructure to run all functionalities of the present system. In the context of a service establishment, such as, for example, a retail store this is specifically very useful as a customer can utilize familiar technologies and receive related and personalized support, assistance, product demos, recommendations, suggestions, etc., which can be handled by a sales associate or customer service agent who has the most expertise and relevant information and who are located proximate to the customer (e.g., on a sales floor, at a business location near the location of the customer, and/or can be handled by the consumer's social network.

In the following discussion, the term "customer" may be used to refer to a potential or existing purchaser of products and/or services of a business. The terms "customer service agent" and "sales associate" may be used herein interchangeably to refer to an employee that provides product and/or sales related assistance to customers of a business. The sales associate or customer service agent may be, by way of example and not limitation, an expert, question and answer provider, merchandise associate, etc. The term "channel" in the present context may refer to various means of communicating such as, for example, online communication (e.g., Internet-based), mobile communication (e.g., wireless communication such as cellular or Wi-Fi), and in-store.

The term "personal shopper" may be used herein to refer to an individual that provides product information, recommendations, and/or purchase assistance to members of their own social network or others under the guidance and/or with the assistance of the operators of a commercial retail business. In the following discussion, the expression "follow"/ "to follow" may, for example, be used to refer to the act of a user requesting to receive updates about the actions of another user, or to be sent messages sent by or information posted by another user, to name just a few examples. The term "tag" may be user herein to refer to a text string or label that may be associated with an item to associate or identify the item with, for example, a particular topic, activity, brand, store, public figure, style, or category of interest.

The terms "cart" or "shopping cart" may be used herein to refer to a collection of items that have been selected for purchase by a user of an e-commerce web site. The term "catalog" may be used herein to refer to, for example, a collection of items selected by a user as favorite products; products being considered for later purchase, and collections of user selected products to be shared with friends, family, or members of a user's social network.

As utilized herein, the terms "exemplary" or "example" mean serving as a non-limiting example, instance, or illustration. As utilized herein, the term "e.g." introduces a list of one or more non-limiting examples, instances, or illustrations.

It should be noted that although the following discussion relates to the use of explicit user similarity in an social e-commerce environment, this does not necessarily represent a specific limitation of the present invention, unless explicitly recited in the claims, as the concept of similarity, and recommendations based on explicit user similarity may apply to any social network or relation between people on a website.

The methods and systems disclosed herein may, for example, be part of an overall shopping experience system created to enhance the consumer shopping event. In one example, the disclosed system may be integrated with a customer reward system, a customer's social network (e.g., the customer can post their shopping activity conducted through the system to their social network), a customer expert system, digital/mobile applications, shopping history, wish list, registry, location, merchandise selections, or the like. It will be appreciated, however, by one of ordinary skill in the art that the system disclosed may be fully and/or partially integrated with any suitable shopping system as desired, including those not mentioned and/or later designed.

In regard to the following discussion of representative embodiments of the present invention, the concept of user similarity may be represented as a value, level, or score that describes how similar one user is to another, in a quantifiable way. More general background about similarity and how it may be used is disclosed through the following examples, which are intended to be illustrative and not limiting.

In accordance with a representative embodiment of the present invention, similarity may be considered to be a weighted, undirected, and symmetric property of a user pair. That is, if a user A is similar to a user B, then user B is also similar to user A, to the same degree, measure, or strength. In addition, similarity may be calculated either overall, or topically (e.g., only with regard to a specific aspect or characteristic (e.g., a tag) of any type). For example, a user A may be similar in general to a user B, but when considering a specific aspect or category C, user A may be very different (and dissimilar) from user B.

The following discussion describes some examples of information types upon which a user similarity level may be based, and how a similarity level may be calculated, and lays out some example uses for such a similarity level such as, for example and not limitation, on an online profile page of a user, and in what is referred to herein as a "people" discovery menu. It should be noted that the disclosed examples are for purposes of illustration and explanation, and are not necessarily specific limitations of the present invention, unless explicitly recited in the claims. It is expected that upon reading and appreciating the teachings of the present disclosure, that future uses of the use of similarity will expand beyond the examples set forth herein.

With reference to the figures, and in particular to the computer network of FIG. 1 in which a representative embodiment of the present invention may be practiced, the following discloses various example systems and methods for providing recommendations based on explicit user similarity. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a customer, e.g., a user, consumer, etc., to access a host system server 68 and, among other things, be connected to a hosted social networking site, a user profile, and/or a sales associate. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a personal computer, mainframe computer, personal-digital assistant ("MAI cellular telephone, tablet, e-reader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30.

Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices would typically be connected to the processing unit 22 by means of an interface 58 which, in turn, would be coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, performing any of the calculation or operations described herein, coordinating a social network, storage of a shopping list, receiving a location of a customer via a mobile device, receiving a request for a service call center connection from either a customer or a sales associate, routing the request via a distributed mobile video call center, providing a service call infrastructure for providing the requestor with a distributed customer service experience, Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2:
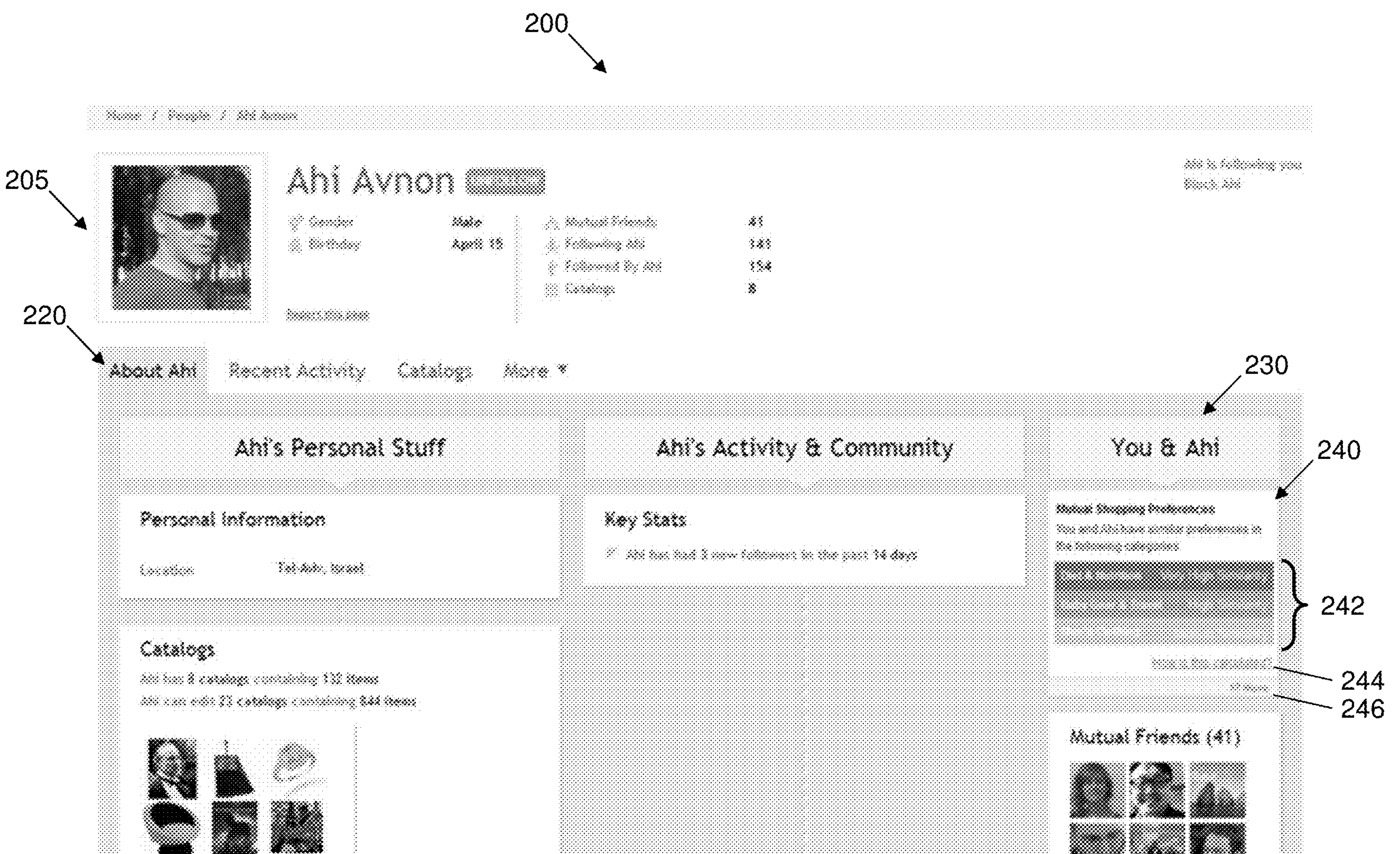
FIG. 2 is an illustration of an example profile page for a user "Tom Smith" as seen by a viewer, in accordance with a representative embodiment of the present invention.

FIG. 2 is an illustration of an example profile page 200 for a user "Tom Smith" as seen by a viewer, in accordance with a representative embodiment of the present invention. A user viewing a web page for a product or service on an e-commerce web site may, for example, arrive at a user profile page such as that illustrated in FIG. 2 by, for example, selecting/clicking one of a group of images or identifiers representing individuals, which may be identified as being similar to the viewer. This enables the viewer to learn more about the selected user, who may have been chosen for identification on the product or service web page, because they, for example, commented on, recommended, purchased, or expressed an interest in a listed product or service.

The example profile page 200 of FIG. 2 comprises a personal information section 205 that includes a name field (showing the name of user "Tom Smith"), an "Unfollow" link that permits the viewer of the profile page 200 to stop "following" user "Tom," a gender field (showing "Tom" as "male"), and a "Birthday" field (showing the month and day of "Tom's" birth). The profile page 200 also includes a "Mutual Friends" field showing the number of friends shared by "Tom" and the viewer (in this case, "Tom" and the viewer have been found to have 41 mutual friends), a "Following Tom" field showing the number of individuals that are "following" user "Tom," and a "Followed by Tom" field showing the number of people being followed by user "Tom." In addition, the profile page 200 includes a "Catalogs" field showing the number of catalogs created by "Tom," an indication that user "Tom" is "following" the viewer of the profile page 200, and a "Block Tom" link that permits the viewer to block user "Tom" from "following" the viewer of the profile page 200.

The example profile page 200 of FIG. 2 also includes a set of tabs ("About Tom", "Recent Activity", "Catalogs", and "More") that permit the viewer to display additional information about user "Tom." As shown in the example of FIG. 2, the "About Tom" tab 220 has been selected and is active, causing additional personal information about user "Tom" to be displayed, including information about "Tom's Activity & Community."

In addition to the features described above, the information of the "About Tom" tab 220 includes a "You & Tom" region 230, which indicates similarities between user "Tom" and the viewer of the profile page 200. For example, the illustration of FIG. 2 includes a "Mutual Shopping Preferences" section 240 that shows a listing of topics or categories 242 indicating that the viewer and "Tom" have very highly similar preferences in the area of "Diet & Nutrition," highly similar preferences in the area of "Baby Gear & Travel," and medium similarity of preferences in the area of "Men's Clothing." The viewer of the profile page 200 may select/click a "How is this calculated?" link 244, to request additional information explaining how the similarity in preferences of user "Tom" and the viewer of the profile page 200 is actually determined. Selecting/clicking the link 244 may cause display of a window explaining the determination of similarity, such as the example shown in FIG. 5, which is discussed in further detail below. Such information may permit the viewer to gain some insight into the factors and parameters used and the reasoning applied in determining the similarity of "Tom" and the viewer for a variety of different topics or categories. The "Mutual Shopping Preferences" section 240 also includes a link "17 more" 246 that indicates that 17 additional topics, categories, or areas of similarity in preferences between "Tom" and the viewer are available for viewing.

It should be noted that in some representative embodiments of the present invention, an indication of similarity of users A and B may not be presented to user A, if user B is flagged as "private." It should also be noted that in some representative embodiments of the present invention, an indication of similarity of users A and B may not be presented to user A, if user B is flagged as "friends-only," and user A does not "follow" user B. The "friends-only" flag/status may be a default setting in some representative embodiments of the present invention.

In addition, it should be noted that the features of the example profile page of FIG. 2 are for illustrative purposes only, and do not necessarily represent specific limitations of the present invention, unless explicitly recited in the claims, as many different ways of conveying similarity in user preferences may be employed without departing from the spirit and scope of the present invention. For example, a representative embodiment of the present invention may provide an indication of overall similarity as, for example, a numeric value (e.g., X out of Y), a textual descriptor (e.g., "Highly Similar," "Very Similar," . . . "Low Similarity"), a graphic (e.g., a bar whose length indicates a degree of similarity, a "similarity meter," a color, a shade of gray, the size of a graphic, etc.) or any other suitable indicator usable as a representation of a degree of similarity of the owner of the profile page 200 and a viewer, as well as individual indications of similarity as a number of topical sub-scores.

Figure 3:
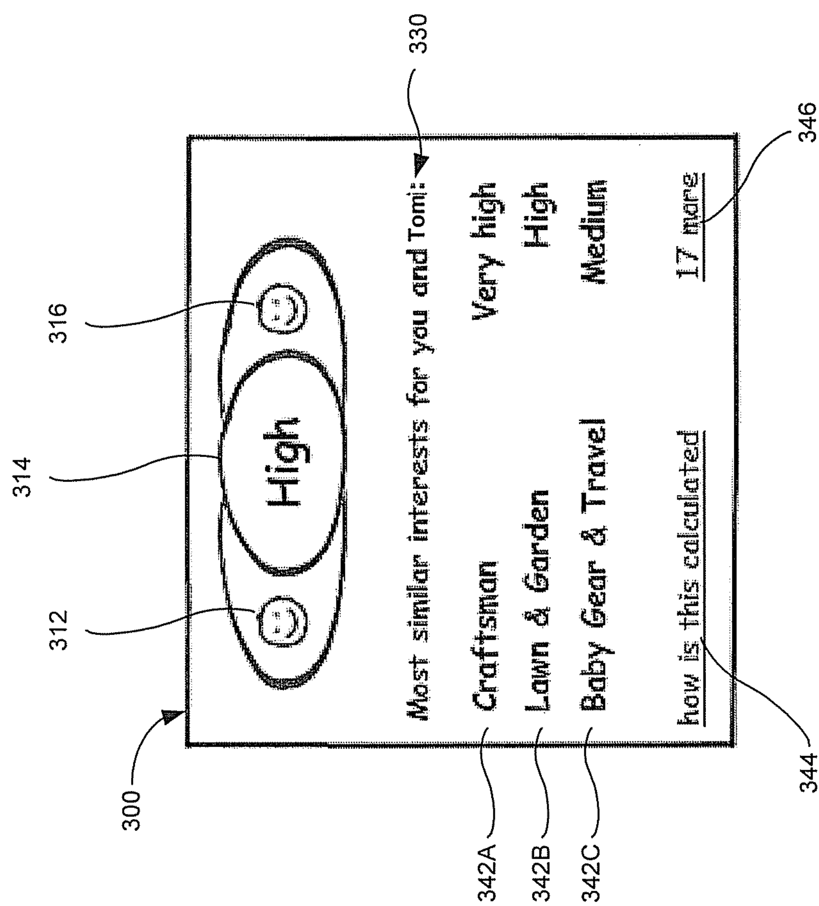
FIG. 3 is an illustration of an example similarity information window representing similarity of two users of, for example, an e-commerce web site, in accordance with one representative embodiment of the present invention.

FIG. 3 is an illustration of an example similarity information window 300 representing similarity of two users of, for example, an e-commerce web site, in accordance with one representative embodiment of the present invention. The example similarity information 300 of FIG. 3 includes a first graphic 312, an indication of overall similarity 314, and a second graphic 316. In the example of FIG. 3, one of first graphic 312 and the second graphic 316 may, for example, represent a first user of a social e-commerce system. The first user may be viewing the similarity information window 300 as part of seeking a recommendation for a product or service of interest. The other of the first graphic 312 and the second graphic 316 may represent a second user that has previously commented on or submitted a recommendation on a product/service of interest to the first user. The second user may be identified by a name field 330. Each of the first graphic 312 and the second graphic 316 may, for example, be a photograph or a graphic representing the respective user.

In a representative embodiment of the present invention, an indication of overall similarity may, for example, be represented as a numeric value (e.g., X out of Y), a textual descriptor (e.g., "Highly Similar," "Very Similar," . . . "Low Similarity"), a graphic (e.g., a bar whose length indicates a degree of similarity, a "similarity meter," a color, a shade of gray, the size of a graphic, etc.) or any other suitable indication as a representation of a degree of similarity of the viewing user seeking a relevant recommendation, and the user that previously commented on or recommended the product or service of interest to the viewing user.

In addition to the indication of overall similarity 314, a representative embodiment of the present invention may include topical sub-scores 342A, 342B, 342C, which provide indications of how the viewing user and the user that submitted a comment or recommendation are similar with respect to one or more topics (e.g., "Craftsman," "Lawn & Garden," and "Baby Gear & Travel") or categories of products. The degree or strength of similarity in each topic or category may be indicated by a numeric value, as descriptive text (e.g., "Very High," "High," "Medium," etc.), or as any suitable graphical representation.

In addition to the above, the similarity information 300 of FIG. 3 may also include a selectable/clickable link 344 to allow the viewer to learn how the similarity of the user viewing the similarity information window 300 and the user (e.g., "Tom") is determined. Selecting/clicking the link 344 may result in the display of a window explaining what is involved in determining similarity, such as the example shown in FIG. 5, discussed in greater detail below. The user may also select/click on a link 346 to view similarity information for other users that have commented on or submitted recommendations for the product or service of interest to the viewing user. Detailed information about how similarity may be calculated is provided below. In a representative embodiment of the present invention, if insufficient information is available to present an indication of similarity, the numeric, textual, or graphical representation of the strength or degree of similarity described above may be replaced by text or graphics indicating, for example, "insufficient data."

Figure 4:
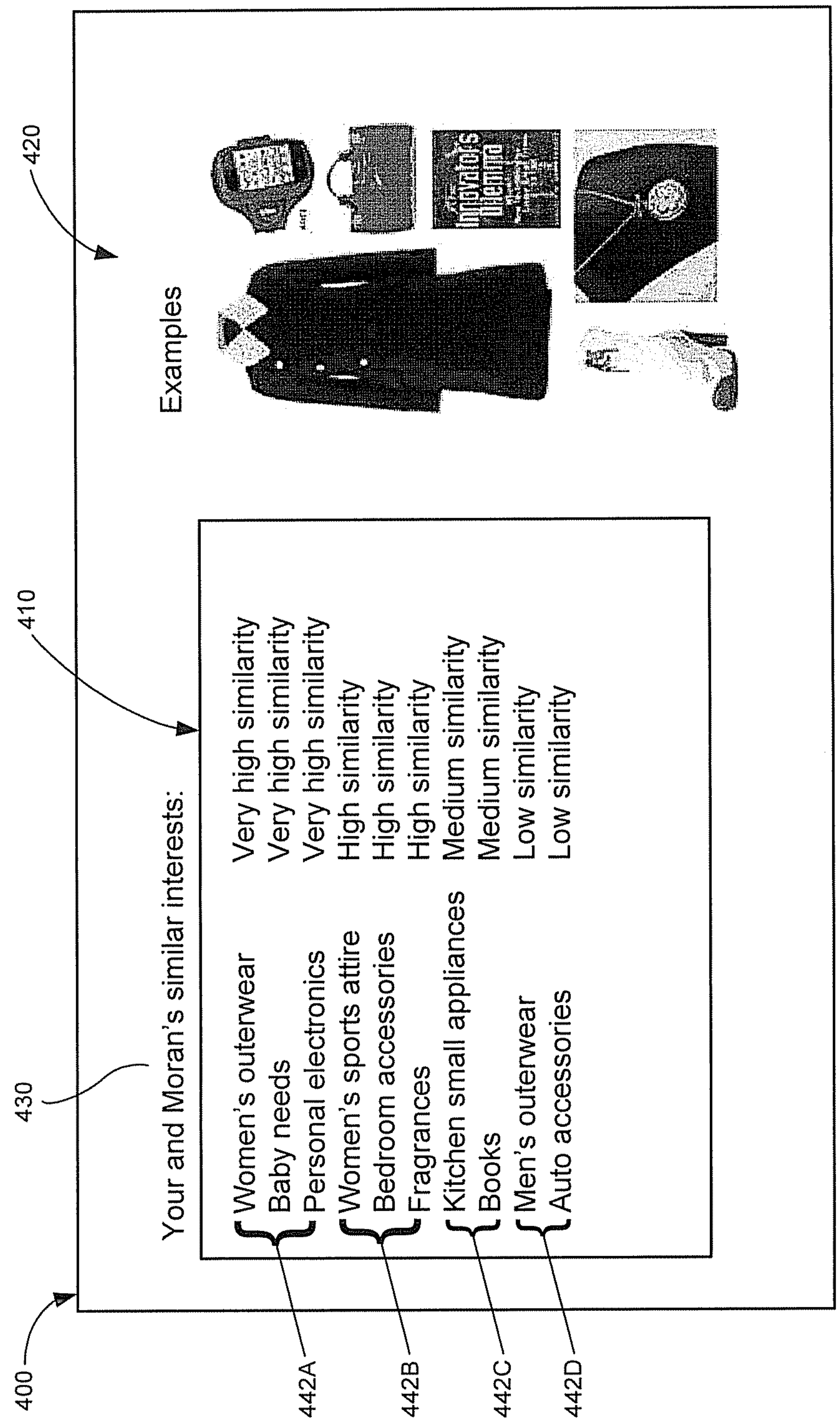
FIG. 4 is an illustration of an example similarity information screen showing detailed similarity information for the viewer of the similarity information screen and an identified user, with regard to a number of topics or categories, in accordance with a representative embodiment of the present invention.

FIG. 4 is an illustration of an example similarity information screen 400 showing detailed similarity information for the viewer of the similarity information screen 400 and an identified user, with regard to a number of topics or categories, in accordance with a representative embodiment of the present invention. The screen 400 includes a name field 430 that identifies the other user with whom similarity to the viewer of the screen 400 has been determined, a listing 410 of topics, categories, or areas of similarity for the viewer and a user identified as "Moran," and images representing product examples from the topics, categories, or areas in which the viewer and user "Moran" exhibit interest. As shown by the first three lines 442A in the example of FIG. 4, the viewer and user "Moran" exhibit "Very high similarity" in their interest in "Women's outerwear," "Baby's needs," and "Personal electronics." The next three lines 442B of FIG. 4 identify "Women's sports attire," "Bedroom accessories," and "Fragrances" as topics in which the viewer and user "Moran" exhibit "High similarity" of interest. The next two lines 442C of FIG. 4 show that the viewer of FIG. 4 and user "Moran" exhibit "Medium similarity" in their interests in "Kitchen small appliances" and "Books," while the last two lines 442D of FIG. 4 identify their interests in "Men's outerwear" and "Auto accessories" as showing "Low similarity."

It should be noted that the number of topics, categories, or areas, and the number of degrees, levels, or strengths of interest shown in FIG. 4 do not necessarily represent specific limitations of the present invention, unless explicitly recited by the claims, and may be different from that shown in FIG. 4, without departing from the spirit and scope of the present invention. For example, in some representative embodiments of the present invention, the top N topics of mutual interest of two individuals (where N=an integer greater than or equal to one) that have a determined similarity level above a certain threshold, may be displayed, while others with a lower determined similarity level may be hidden from view. Those displayed topics or categories may be accompanied by a representation of the degree or strength of the similarity as described above. In cases where more than N mutual interests having a similarity level above the threshold exist, a link may be displayed that permits the viewing user to access/display a complete list of interest topics, categories or areas.

Figure 5:
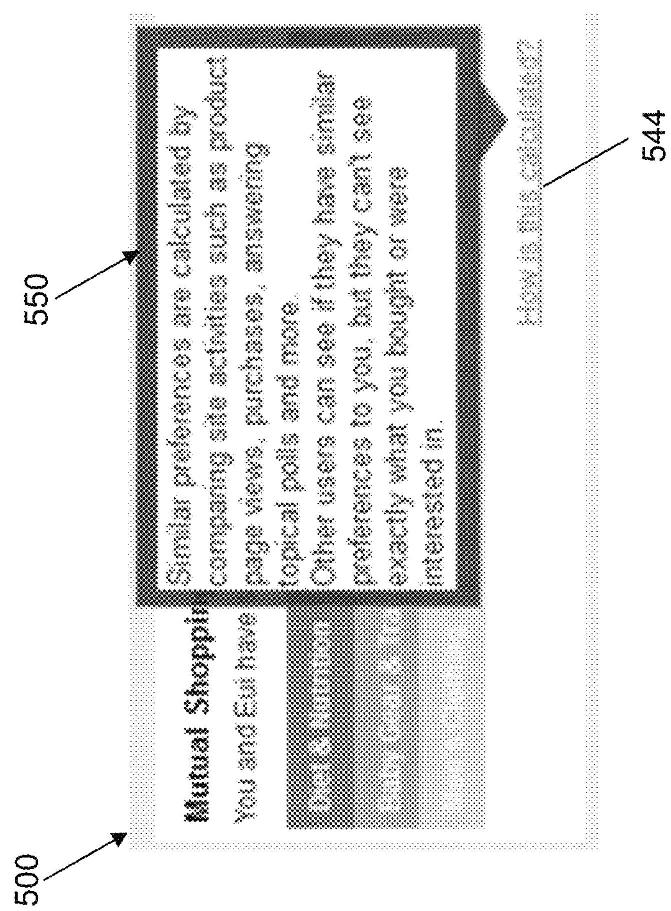
FIG. 5 is an illustration of an example pop-up window used to display information explaining to a user how similarity of the user and another individual is determined, in accordance with a representative embodiment of the present invention.

FIG. 5 is an illustration of an example pop-up window 550 used to display information explaining to a user how similarity of the user and another individual is determined, in accordance with a representative embodiment of the present invention. As shown in the illustration of FIG. 5, the pop-up window 550 may, for example, be accessed via a link 544 while viewing a mutual shopping preferences information window 500 that identifies those topics, categories, or areas in which the shopping preferences of the viewer and another user (in this example, a user named "Eui") are similar, and an indication of the degree or strength of similarity of their shopping preferences. The pop-up window 550 may provide a general explanation that similarity in preferences is calculated by comparing user web site activities such as product page views, purchases, responses to online surveys, and other user behaviors. In some representative embodiments, the pop-up window 550 may explain to a user that other users may be able to see whether they have similar preferences to the user, but may not be permitted to see exactly what items others have purchased, or were interested in.

In accordance with a representative embodiment of the present invention, a link such as the link 544 of FIG. 5 may appear, for example, in any web page, pop-up window, or other graphical user interface (GUI) element through which the user is being provided information about the similarity of their interests and the interests of other users of, for example, a social e-commerce system such as that supported by the elements of the computer network illustrated in FIG. 1. For example, the link 544 may correspond to the link 244 on the profile page 200 of FIG. 2, or the link 344 on the similarity information window 300 of FIG. 3. It should be noted that FIG. 5 is for illustrative purposed only, and does not necessarily represent specific limitations of the present invention, unless explicitly recited by the claims.

Figure 6:
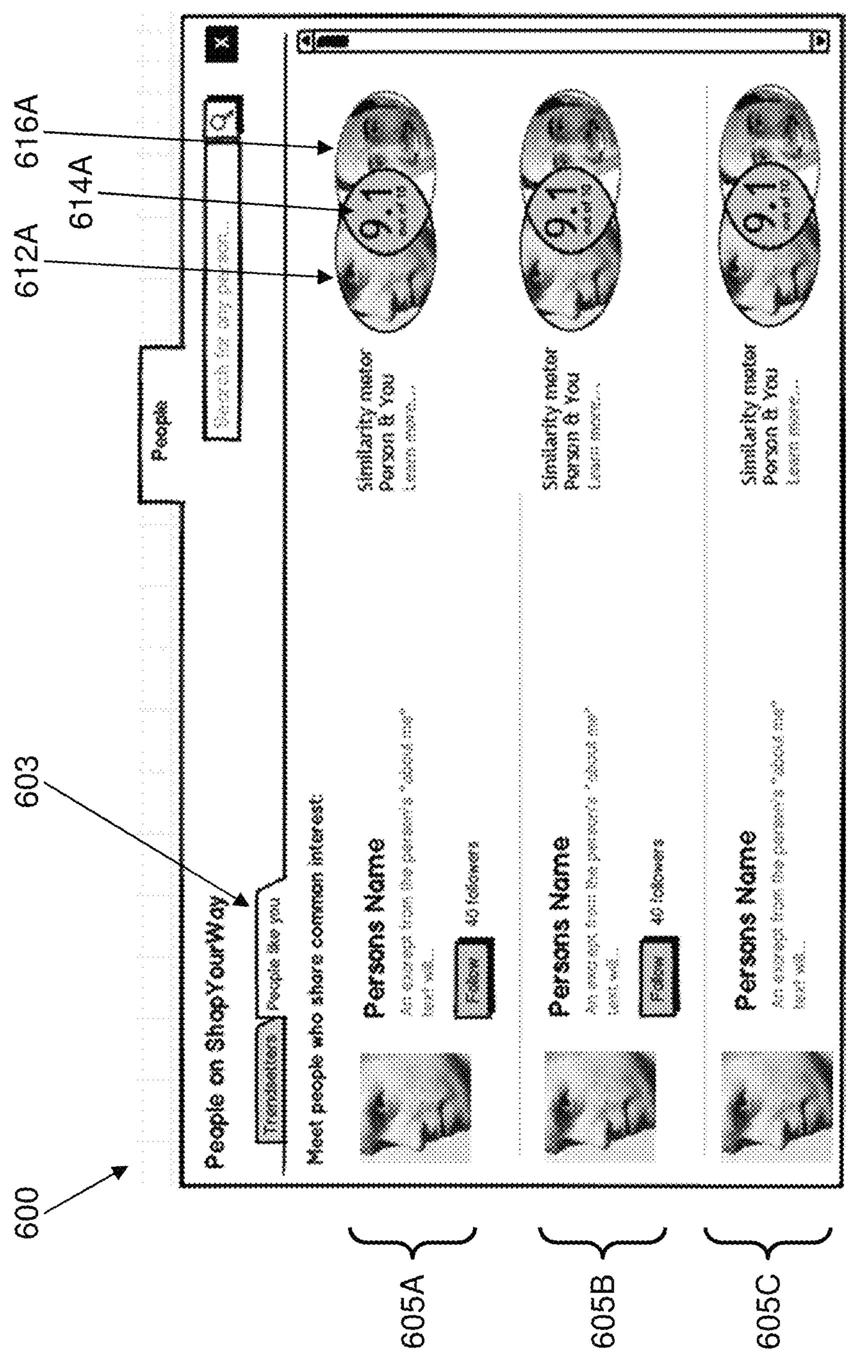
FIG. 6 is an illustration of an example "people" discovery menu, in accordance with a representative embodiment of the present invention.

FIG. 6 is an illustration of an example "people" discovery menu 600, in accordance with a representative embodiment of the present invention. In one representative embodiment of the present invention, a "people" discovery menu like that of FIG. 6 may include, for example, a tab (e.g., "People like you" tab 603) or window that may be powered by a user similarity level such as those described herein. The example "people" discovery menu 600 of FIG. 6 includes entries 605A, 605B, 605C identifying a number of individuals found to share common interests with the user viewing the "people" discovery menu 600. As shown in FIG. 6, each of the individual entries 605A, 605B, 605C comprise an image of the individual (if available), the name of the individual, a brief text passage about the individual, a "Follow" button to request that the viewer be kept updated on actions, messaging, etc. of the identified individual, and an indication of the numbers of other individuals presently "Following" the identified individual. In a representative embodiment of the present invention, the personal information displayed in the entries 605A, 605B, 605C may be the same as that displayed on a corresponding profile page for the identified individual such as, for example, the personal information shown on the profile page 200 illustrated in FIG. 2.

In addition to the personal information in the left portion of each of individual entries 605A, 605B, 605C, the entries 605A, 605B, 605C also include at the right end, an example of one approach to displaying a similarity level 614A representing overall similarity of the individual identified by the left portion of individual entries 605A, 605B, 605C of FIG. 6, represented by a first graphic 612A, and the viewer of the "people" discovery menu 600, represented by a second graphic 616A. Although shown as a numeric value in the example of FIG. 6, the degree or strength of similarity of the individual identified by the entries 605A, 605B, 605C to the viewer of the "people" discovery menu 600 shown as similarity level 614A may instead be expressed as a textual phrase, a color, a shade of gray, a graphic, or any other suitable means. The "people" discovery menu 600 may also include a "See why" or "How is this calculated?" link (not shown), similar to those discussed above with respect to FIG. 2 and FIG. 3, which may, for example, open the same type of window described above with respect to FIG. 5. In a representative embodiment of the present invention, the individuals represented on a menu such as, for example, the "people" discovery menu 600 may be determined and identified by a first element of the computer network of FIG. 1, while digital information representing the "people" discovery menu 600 transmitted to a viewer of FIG. 6 may be generated by a different second element of the computer network of FIG. 1, where the first element provides an ordered list of user identifiers to the second element for use in generating the corresponding information for each user identifier on the "people" discovery menu 600.

In some representative embodiments of the present invention, the individuals represented in a menu such as the "people" discovery menu 600 may not be users that the viewer is currently "following," and may not be users that have an associated status/flag setting that represent a "private" status, or a user having a "friends-only" status that the viewer does not "follow." In accordance with a representative embodiment of the present invention, those individuals selected for inclusion may, at a minimum, have an overall high similarity level with the viewer. Individuals listed on the "people" discovery menu 600 may be those users with the highest similarity with the viewer, in order of the degree or strength of similarity with the viewer. In some representative embodiments of the present invention, information about topical interest similarity may also be available to the viewer of a menu such as the "people" discovery menu 600. Further details about how individuals may be identified for inclusion in a listing such as the "people" discovery menu 600 are provided below. It should be noted that, while it is preferable that the search for individuals similar to the viewer of FIG. 6 be exhaustive, an exhaustive search is not required, and satisfactory results may be obtained by adhering to the criteria described above.

The following discussion provides further details on how similarity is calculated in accordance with a representative embodiment of the present invention, including the types of data used, how the data may be cleaned and normalized, and how a calculated similarity level or score may be translated or mapped to a corresponding textual or graphic representation.

A representative embodiment of the present invention may calculate a similarity level or similarity score in the following manner. Let us assume that we have a set of n users, $\{U_i\}_{i=1 \ldots n}$. Each of the n users may be characterized by a set of m attributes $\{Ai\}_{j=1, \ldots m}$ built with information about each user's interaction with an application on a computer network such as, for example, a social e-commerce application such that may be used on the computer network illustrated in FIG. 1 and described above. For example, the computer network of FIG. 1 may be arranged to operate as a social e-commerce system that enables users to engage in social interactions as well as, and as a part of, shopping for products and/or services.

In a representative embodiment of the present invention, the strength of the relations between users and attributes may be expressed using weights $W_{ij}$. Thus, each user i may be identified by the set of all attributes weights he/she currently possess. This set of all attributes weights for a user i may be represented by a vector in an m-dimensional parameter space as: $UV_i=\{W_i\}_{j=1 \ldots m}$. In order to calculate how similar two users are to one another, we may calculate the similarity between their respective vectors. While there are several methods that may be used, for the purposes of this discussion a method using what may be referred to herein as "cosine similarity" will be employed. It should be noted, however, that the use of this particular method of calculating similarity between such vectors does not necessarily represent a limitation of the present invention, unless explicitly recited by the claims, as other suitable methods of calculating similarity between such vectors may also be used.

Cosine similarity as used herein represents the angular distance between two vectors. Cosine similarity may be computed by taking the dot-product between two vectors divided by their norms, as represented by the mathematical expression shown below:

$$Sim_{a,b} = \frac{\sum_j UV_{a,j} * UV_{b,j}}{\| UV_a \| * \| UV_b \|}$$

where the norm may be calculated as:

$$\| UV_a \| = \sqrt{\sum_{j=1 \ldots m} (W_{a,j})^2}$$

The resulting similarity value, $Sim_{a,b}$, may be expected to fall in the range [−1,1].

Because the attributes frequency (e.g., user interests) may not necessarily be evenly distributed, a bias towards more frequently occurring values may be observed. To correct for such bias, a representative embodiment of the present invention may use a level referred to herein as the Inverse User Frequency (IUF). IUF as used herein is inverse to the frequency (i.e., the number of distinct users associated with an attribute) of the attribute, as shown below:

$$IUF_j = \log\frac{\text{Number of users}}{\text{Number of users with attribute } j}$$

The attributes vector for a user i may then be corrected to be:

$$UV_i = \{W_{i,j} \circ \text{IUF}_j\}_{j=1 \ldots m}.$$

$$\| UV_a \| = \sqrt{\sum_{j=1 \ldots m} (W_{a,k} \circ IUF_j)^2}$$

In a representative embodiment of the present invention, an overall similarity level between users may be calculated by aggregating several similarity levels such as, for example, similarity by user interests, similarity by product preferences, and similarity by using users' answers to online surveys, to name only three possible similarity levels that may be used.

A representative embodiment of the present invention may use calculated user interest to generate attributes vectors for a user. The weight for each vector element may be the score associated with the user for a specific interest tag, corrected by the IUF (Inverse User Frequency) for the tag. To generate a meaningful set of tags, a representative embodiment of the present invention may perform preprocessing upon tag information such as, for example, one or more of removing tags which have less than a certain number of users associated with the tags (e.g., at least 2), and removing tags with more than a certain number of user associated with the tags (e.g., at most 10% of the users), and removing attributes that are not relevant in determining user similarity. A representative embodiment of the present invention may also, for each user, select the top maxTagsNumber of tags with a 'weight' greater than a minInterestWeight as what may be termed "relevant tags," to limit the amount of data stored, while taking into account the fact that very small interests contribute very little to the calculated similarity. In addition, an IUF for each tag may be calculated over all tags, according to the formula given above. In a representative embodiment of the present invention, the collection of tags scores for the relevant tags may be used to calculate what may be referred to herein as an "interest similarity" value between two users using, for example, the calculation of cosine similarity, discussed above.

For the calculation of user interest similarity to be meaningful, a representative embodiment of the present invention may calculate user interest similarity only for users with at least r relevant interests, where r may be a multiple of 10 tags, as shown below.

Let $\text{InterestScore}_{j,a}$ be the weight of interest j for user a:

$$Sim_{interest}(a,b)=\text{CosineSimilarity}(UV_a^{Interest},UV_b^{Interest})$$

$$UV_a^{Interest}=\{\text{InterestScore}_{j,a} \circ IUF_j\}_{j=1 \ldots m}$$

A representative embodiment of the present invention may employ an interest aggregation calculation that may take into account the difference between explicit and implicit user interactions. For the purpose of the present discussion, "implicit interactions" may be defined as those user actions that don't generate User Generated Content (UGC) that a "friend" can see in this user's profile. User actions considered herein to be "implicit interactions" may, for example, include a "page view" or "quick view," a vote on a online survey, the addition of an item to a "shopping cart," a purchase of one or more items, and the addition of an item to a "catalog," to name only a few examples. Implicit interactions may be more likely to be considered somewhat private by users, even to those considered as friends.

Some representative embodiments of the present invention may give greater weight to what may be referred to herein as "explicit interactions" such as, for example, when a user selects an interest and clicks on/selects a button to follow that interest, effectively saying "I am interested in this." In contrast, the situation where a user visits a page for a particular interest multiple times but does not explicitly indicate his/her interest is referred to herein as an "implicit" interest. Some aspects of representative embodiments of the present invention such as, for example, those described above with regard to FIG. 5 that provides a general explanation of how a similarity level may be calculated, may help to make the relationship of a similarity level for a pair of users to the activities of those two users more intuitive to the users.

A representative embodiment of the present invention may use similarity by product preference to generate a more granular view into the similarity between two users. Product preference similarity in accordance with a representative embodiment of the present invention may be based on mapping the products each user has interacted with, with the facets relevant to the product. The term "facets" may be used herein to refer to product details that may be product category dependent details such as "brand," "price," "color," "size," "capacity," "refresh rate," "voltage," and "fabric," to name only a few. Using such a mapping, a product preference vector may be built for each user. Each element of the product preference vector may represent a facet relevant to the product. The element score may be calculated by summing the user interaction score with the product facet score for all products attached to that facet of the product. An attributes vector for product preference may be defined in the following manner:

Let $F_k$ be a specific product facet.

Let $\{P_{l,a}\}$ be the collection of products that share $F_k$ and are interests of user a.

We define the product facet score for facet k and user a as:

$$\text{Product\_Facet\_Score}_{k,a} = \sum_{P_{l,a} \in F_k} P_{l,a}$$

$$UV_a^{Products} = \{\text{Product\_Facet\_Score}_{a,k}\}_{k=1 \ldots m}$$

Let $P_{j,k}$ be the facet k score of product j. Let $W_{i,j}$ be the user i interaction score with product j (taking into account the Inverse Users Frequency for that product). A product facet score may then be computed as:

$$\text{Product\_Facet\_Score}_{k,a} = \Sigma_{products_j \in facet_k} W_{ij} {}^{o} P_{j,k}$$

To generate a meaningful set of facets, a representative embodiment of the present invention may perform pre-processing by, for example, calculating similarity only for users with at least minUserNumOfProduct number of related products. Such pre-processing may use only facets with more than minFacetNumOfProducts number of related products, and may use only facets with less than maxFacetNumOfProducts number of related products. In addition, the pre-processing may, for each user, select the top maxFacetsNumber with |weight| greater than minFacetWeight.

In addition, an Inverse User Frequency for the product may be calculated over the products using the formula for IUF, discussed above.

In a representative embodiment of the present invention, a product preference similarity between two users may be calculated by applying cosine similarity to the users' facets vectors, as shown below $$Sim_{products}(a,b) = \text{CosineSimilarity}(UV_a^{Products}, UV_b^{Products})$$

As mentioned above, a representative embodiment of the present invention may also include a calculation of similarity by online surveys. For example, a representative embodiment of the present invention may calculate similarity between first user, u, and a second user, v, for a specific tag, t, based on their answers to polls as:

$$Sim(u, v, t) = \sum_{p \in Polls} \sum_{a \in Answers} a_{u_t} a_{v_t} (1 - a_{p_t})$$

where:

$a_{u_t}$ = Weight of tag $t$ in answer of $u$;

$a_{v_t}$ = Weight of tag $t$ in answer of $v$ $$a_p = \frac{\text{Number of users voted } a \text{ in } p}{\text{Number of users voted in } p}$$

$$a_{p_t} = \frac{\text{Number of users voted an answer with tag } t}{\text{Number of users voted in } p}$$

A representative embodiment of the present invention may, for example, calculate similarity between first user, u, and a second user, v, for all tags based on their answers to polls as:

$$Sim(u, v) = \frac{2}{TotalAnswerOfU + TotalAnswersOfV} \sum_{\substack{a \in Answers, \\ \text{both } u \text{ and } v \text{ voted } a \text{ in } p}} (1 - a_p)$$

As previously noted above, in a representative embodiment of the present invention, similarity scores or levels may be calculated as numeric values in the range between 0 (i.e., not similar) and 1 (i.e., completely similar). The range of similarity score values calculated as shown above, which lie in the interval −1 to +1 may be subdivided, categorized, grouped, or mapped into, for example, a set of textual phrases, having a low-granularity scale, which may be displayed to a user via a user interface such as the listing of topics or categories 242 shown in FIG. 2, the similarity information window 300 of FIG. 3, or the listing of topics, categories, or areas of similarity 410 illustrated in FIG. 4. Such textual phrases used to convey the degree or strength of similarity between users may include, for example, "Very high" to represent user similarity that shows a very high degree of overlap (e.g., both users have this specific interest with a high weight), “High,” “Medium,” “Low,” and “Very low” to signify very low degree of similarity, but not necessarily dissimilarity. For example, “Very low” may represent that both users have this specific interest, but that one user has it to a very high degree or strength, while the other user has it at a very low degree or strength.

In a representative embodiment of the present invention, the numeric similarity values may be mapped to the sample scale described above in a way that distributes them between these values. Dissimilarity (e.g., when one user is very interested in X and the other has indicated he/she is very not interested using the “hide” feature) may be considered as having no similarity at all. In accordance with a representative embodiment of the present invention, the actual divisions or borders subdividing the range of values of a similarity score or level into categories or groups may be determined empirically, and may be adjusted according to a final distribution of similarity score values.

A representative embodiment of the present invention may calculate overall similarity using the following formula:

$$sim(a, b) = Sim_{interest}(a, b)^{\alpha} * Sim_{products}(a, b)^{\frac{1}{\alpha}}$$

A representative embodiment of the present invention may determine the top N mutual interests by sorting the values in the mutual interests score product and filtering by a minimal threshold:

$$\{\text{InterestScore}_{j,a} \circ \text{InterestScore}_{j,b} \circ IUF_j\}_{for\ all\ pairs\ j\ where\ this\ value>th}$$

$$\{\text{InterestScore}_{j,a} \circ \text{InterestScore}_{j,b}\}_{for\ all\ pairs\ j\ where\ this\ value>th}$$

In some representative embodiments of the present invention, a list of similar users may be compiled from a predefined list of users that are not marked or flagged as “private.” The users on the predefined list of users may also be those users that are “interesting enough.” By that it is meant that such users present a significant level of interaction with the system of interest such as, for example, a social e-commerce system or platform such as may be supported by the computer network of FIG. 1, described above.

In some representative embodiments of the present invention, a metric that may be used to determine how interesting a user is may be the norm of the user interests vector, $\|UV_a^{Interest}\|$. A threshold value may be defined for this quantity, and only users with norms higher than the threshold value may be selected as “interesting enough.” This threshold value may be updated periodically, because the total “interest” in a system such as that described herein may be expected to be an increasing monotonic function.

A representative embodiment of the present invention may, for a given user, calculate a similarity score or level between the given user and each of the users in an “interesting users list” that may be made up of users that have been designated as “interesting enough,” as described above. The results of those calculations may be sorted by the similarity score or level, and the top N users supporting mutual interests may be returned.

Figure 7:
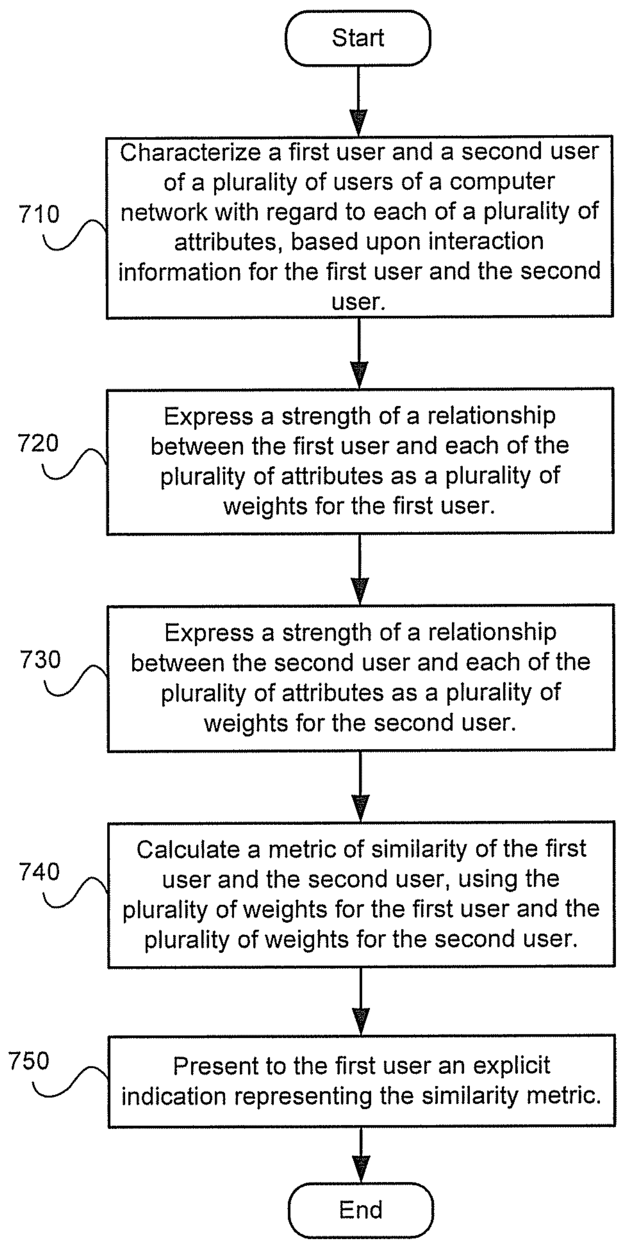
FIG. 7 is a flowchart for an exemplary method of producing a recommendation for a first user using interaction information for each of the first user and a second user of a plurality of users of a computer network, in accordance with a representative embodiment of the present invention.

FIG. 7 is a flowchart for an exemplary method of producing a recommendation for a first user using interaction information for each of the first user and a second user of a plurality of users of a computer network, in accordance with a representative embodiment of the present invention. In a representative embodiment of the present invention, the interaction information for the first user and the second user may be derived from interactions of the first user and the second user with the computer network. The method of FIG. 7 may be performed by, for example, one or more processors in a computer network such as the computer network illustrated in and described above with respect to FIG. 1.

The method of FIG. 7 begins at block 710, at which the method characterizes the first user and the second user with regard to each of a plurality of attributes, based upon the interaction information for the first user and the second user. The method may then, at block 720, express a strength of a relationship between the first user and each of the plurality of attributes as a plurality of weights for the first user. Next, at block 730, the method may express a strength of a relationship between the second user and each of the plurality of attributes as a plurality of weights for the second user. The method may then, at block 740, calculate a level of similarity of the first user and the second user, using the plurality of weights for the first user and the plurality of weights for the second user. Finally, the method of FIG. 7 may present to the first user an explicit indication representing the similarity level.

In a representative embodiment of the present invention, recommendations are based off of similarity of individuals. That is, using a group of people found to be similar at some level to derive other recommendations such as, for example, recommending a product to an individual based upon knowledge of products that are popular among people similar to that individual. In addition, a representative embodiment of the present invention makes similarity of individuals explicit, by showing one individual why he/she is similar to another. In this way, a representative embodiment of the present invention may explicitly inform an individual of the products that have been, for example, viewed by someone with tastes similar to the individual.

Aspects of the present invention may be seen in a method of producing a recommendation for a first user using interaction information for each of the first user and a second user of a plurality of users of a computer network. In such a method, the interaction information for the first user and the second user may be derived from interactions of the first user and the second user with the computer network. The method may, for example, comprise characterizing the first user and the second user with regard to each of a plurality of attributes, based upon the interaction information for the first user and the second user. The method may also comprise expressing a strength of a relationship between the first user and each of the plurality of attributes as a plurality of weights for the first user, and expressing a strength of a relationship between the second user and each of the plurality of attributes as a plurality of weights for the second user. The method may further comprise calculating a level of similarity of the first user and the second user, using the plurality of weights for the first user and the plurality of weights for the second user, and presenting to the first user an explicit indication representing the similarity level.

In various representative embodiments, the computer network may comprise an e-commerce system, the interaction information may be derived from social network activities of the first user and the second user over the computer network, and the interaction information may be derived from implicit interactions. In a representative embodiment of the present invention, implicit interactions may comprise one or more of: a page view, a quick view, a vote on a online survey, an addition of an item to an online shopping cart, a purchase of one or more items, and/or an addition of an item to a private catalog. Calculating the level of similarity of the first user and the second user may comprise calculating an aggregated similarity level based on user interests and product preferences, and calculating the level of similarity of the first user and the second user may comprise correcting the plurality of weights for each of the first user and the second user based upon the number of distinct users associated with each attribute.

Additional aspects may be observed in a non-transitory computer-readable medium having stored thereon a plurality of code sections, each code section comprising a plurality of instructions executable by a processor to cause the processor to perform a method of producing a recommendation for a first user using interaction information for each of the first user and a second user of a plurality of users of a computer network, the interaction information for the first user and the second user derived from interactions of the first user and the second user with the computer network, where the method performed is as described above.

Further aspects of the present invention may be found in a system for producing a recommendation for a first user using interaction information for each of the first user and a second user of a plurality of users of a computer network, the interaction information for the first user and the second user derived from interactions of the first user and the second user with the computer network, where the system performs the method described above.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:

characterizing a first user and a second user based on interaction information for the first user and the second user via a network;

calculating a level of similarity of the first user and the second user based on the interaction information;

providing, to the first user, a recommendation of a product or a service based on the interaction information for the first user and the second user and the similarity level;

providing, to the first user, information relating to the second user so that reasons for the similarity can be reviewed by the first user;

causing, via a selection of one or more graphical elements of a graphical user interface when the information relating to the second user is presented, a list of categories and their respective similarity levels to be presented; and causing, via a selection of one or more graphical elements of the graphical user interface, to be presented how one or more of the similarity levels are calculated.

2. The method according to claim 1, wherein the network comprises an e-commerce system.

3. The method according to claim 1, wherein the interaction information is based on online social network activities of the first user and the second user via the network.

4. The method according to claim 1, wherein the interaction information is based on implicit interactions.

5. The method according to claim 1, wherein calculating the level of similarity of the first user and the second user comprises calculating an aggregated similarity level based on user interests and product preferences.

6. The method according to claim 1, wherein providing the recommendation to the first user comprises providing a level of similarity of a first attribute weight vector and a second attribute weight vector.

7. The method according to claim 1, wherein the interaction information is based on one or more of a vote on an online survey, an addition of an item to an online shopping cart, a purchase of one or more items, and an addition of an item to a catalog.

8. The method according to claim 1, wherein calculating the level of similarity of the first user and the second user comprises calculating an aggregated similarity level based on user interests and product preferences.

9. The method according to claim 1, wherein calculating the level of similarity of the first user and the second user comprises calculating the aggregated similarity level using answers to online surveys.

10. The method according to claim 1, wherein characterizing the first user and the second user is with respect to attributes.

11. The method according to claim 10, wherein calculating the level of similarity of the first user and the second user comprises adjusting a plurality of weights for each of the first user and the second user based upon a number of distinct users associated with each attribute.

12. The method according to claim 1, wherein the list of categories and their respective similarity levels are used to determine whether opinions of the second user are useful to the first user.

13. The method according to claim 1, comprising normalizing the calculated similarity levels for corresponding categories into different level categories.

14. The method according to claim 13, wherein the normalized similarity levels comprise two or more different level categories.

15. The method according to claim 13, wherein the normalized similarity levels comprise three or more different level categories.

16. The method according to claim 1, wherein, although how one or more of the similarity levels are calculated is presented, the privacy of the second user is maintained.

17. The method according to claim 16, wherein particular purchases of the second user are not revealed.

18. The method according to claim 1, comprising:

expressing a strength of a relationship between the first user and each of a plurality of attributes as a plurality of weights; and expressing a strength of a relationship between the second user and each of a plurality of attributes as a plurality of weights.

19. The method according to claim 18, comprising calculating a metric of similarity of the first user and the second user based on the weights of the first user and the weights of the second user.

20. The method according to claim 19, comprising expressing a graphical indication representing the similarity metric.

* * * * *